US012204467B2

(12) United States Patent
Inglis et al.

(10) Patent No.: US 12,204,467 B2
(45) Date of Patent: *Jan. 21, 2025

(54) DATA ACCESS PATH OPTIMIZATION

(71) Applicant: Daedalus Cloud LLC, Croton-on-Hudson, NY (US)

(72) Inventors: Stuart John Inglis, Cambridge (NZ); Leon Wiremu Macrae Oud, Cambridge (NZ); Dominic Joseph Michael Houston Azaris, Cambridge (NZ); Jack Spencer Turpitt, Cambridge (NZ)

(73) Assignee: Daedalus Cloud LLC, Croton-on-Hudson, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/512,254

(22) Filed: Nov. 17, 2023

(65) Prior Publication Data

US 2024/0202141 A1 Jun. 20, 2024

Related U.S. Application Data

(63) Continuation of application No. 17/581,061, filed on Jan. 21, 2022, now Pat. No. 11,860,798.

(60) Provisional application No. 63/140,606, filed on Jan. 22, 2021.

(51) Int. Cl.
*G06F 13/16* (2006.01)
(52) U.S. Cl.
CPC .................... *G06F 13/16* (2013.01)

(58) Field of Classification Search
CPC ...................................................... G06F 13/16
See application file for complete search history.

(56) References Cited

U.S. PATENT DOCUMENTS

| 7,472,234 | B2 | 12/2008 | Landry |
| 7,581,064 | B1 | 8/2009 | Zedlewski et al. |
| 7,743,140 | B2 | 6/2010 | Arndt et al. |
| 8,041,915 | B1 | 10/2011 | Wahlig et al. |
| 9,792,212 | B2 | 10/2017 | Liu et al. |
| 2007/0083728 | A1 | 4/2007 | Nijhawan et al. |
| 2015/0262632 | A1* | 9/2015 | Shelton ............... G06F 12/0684 711/103 |
| 2020/0042358 | A1* | 2/2020 | Sun ..................... G06F 12/0284 |

FOREIGN PATENT DOCUMENTS

EP 3605331 A1 2/2020

OTHER PUBLICATIONS

Jun. 7, 2022—Extended European Search Report—EP 22152830.0.

* cited by examiner

*Primary Examiner* — David E Martinez
(74) *Attorney, Agent, or Firm* — Ascenda Law Group, PC

(57) ABSTRACT

Aspects disclosed herein relate to a method comprising: obtaining a list of data paths to at least one persistent storage device through a plurality of NUMA nodes; associating with each data path, access performance information; receiving a request to access one of the at least one persistent storage device; calculating a preferred data path to the one of the at least one persistent storage device using the access performance information; and accessing the one of the at least one persistent storage device using the preferred data path.

17 Claims, 7 Drawing Sheets

DATA ACCESS PATH OPTIMIZATION

CROSS-REFERENCE TO RELATED APPLICATION

Figure 1:
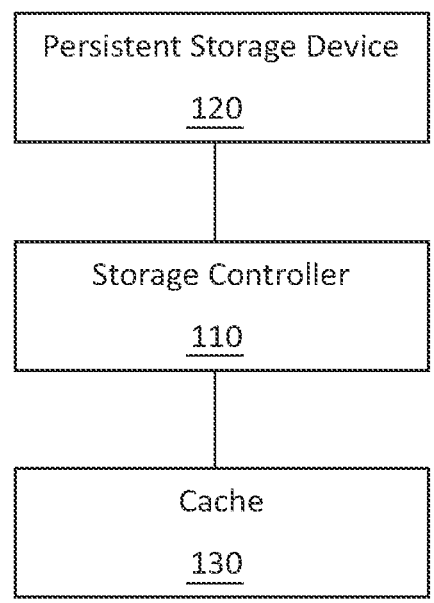

This application is a continuation of U.S. application Ser. No. 17/581,061 filed on Jan. 21, 2022 (now issued as U.S. Pat. No. 11,860,798), which claims priority as a non-provisional of U.S. Provisional Patent Application No. 63/140,606, titled "DATA ACCESS PATH OPTIMIZATION" and filed on Jan. 22, 2021, the disclosure of which is incorporated herein by reference in its entirety.

FIELD

This relates to data access path optimization.

BACKGROUND

Data is stored on one or more persistent storage devices, such as a number of drives. When data is to be written, the data is written via a data path onto the persistent storage device. When data is to be read, the data is read from a persistent storage device via a data path and returned to the data requester.

SUMMARY

In a first example embodiment, a method comprises obtaining a list of data paths to at least one persistent storage device through a plurality of non-uniform memory access (NUMA) nodes; associating with each data path, access performance information; receiving a request to access one of the at least one persistent storage device; calculating a preferred data path to the one of the at least one persistent storage device using the access performance information; and accessing the one of the at least one persistent storage device using the preferred data path.

Preferably the method further comprises updating the access performance information of the used data path.

Preferably the access performance information of each data path includes at least the last update time of the access performance information.

Preferably the method further comprises identifying data paths for testing; testing the identified data paths; and updating the access performance information of the tested data path.

Preferably identifying data paths for testing further comprises: calculating the age of the access performance information using the last update time; and identifying data paths for testing having access performance information exceeding an age threshold.

Alternatively identifying data paths for testing further comprises selecting a percentage of all data paths for testing.

Alternatively identifying data paths for testing further comprises selecting all the data paths that have an error for testing.

Preferably the access performance information of each data path includes at least a latency of the data path.

Preferably the preferred data path is calculated based on at least the latency of the data path.

Preferably the access performance information of each data path includes at least an average bandwidth indicator of the data path.

Preferably the preferred data path is calculated based on at least the average bandwidth indicator of the data path.

Preferably the access performance information of each data path includes at least a load on the data path.

Preferably the preferred data path is calculated based on at least the load on the data path.

Preferably the access performance information of each data path includes at least a reliability indicator of the data path.

Preferably the preferred data path is calculated based on at least the reliability indicator on the data path.

Preferably the access is read access.

Preferably the access is write access.

In a second example embodiment, a system comprises a memory; a plurality of NUMA nodes, each NUMA node comprising: at least one CPU core; and at least a portion of the memory is attached to the at least one CPU core, wherein the memory comprises instructions which, when executed by the plurality of NUMA nodes, configures the plurality of NUMA nodes to perform the method the first example embodiment.

In a third example embodiment, a non-transitory computer readable medium comprises instructions which, when executed by one or more processors, cause the one or more processors to perform the method the first example embodiment.

BRIEF DESCRIPTION

The description is framed by way of example with reference to the drawings which show certain embodiments. However, these drawings are provided for illustration only, and do not exhaustively set out all embodiments.

Figure 2:
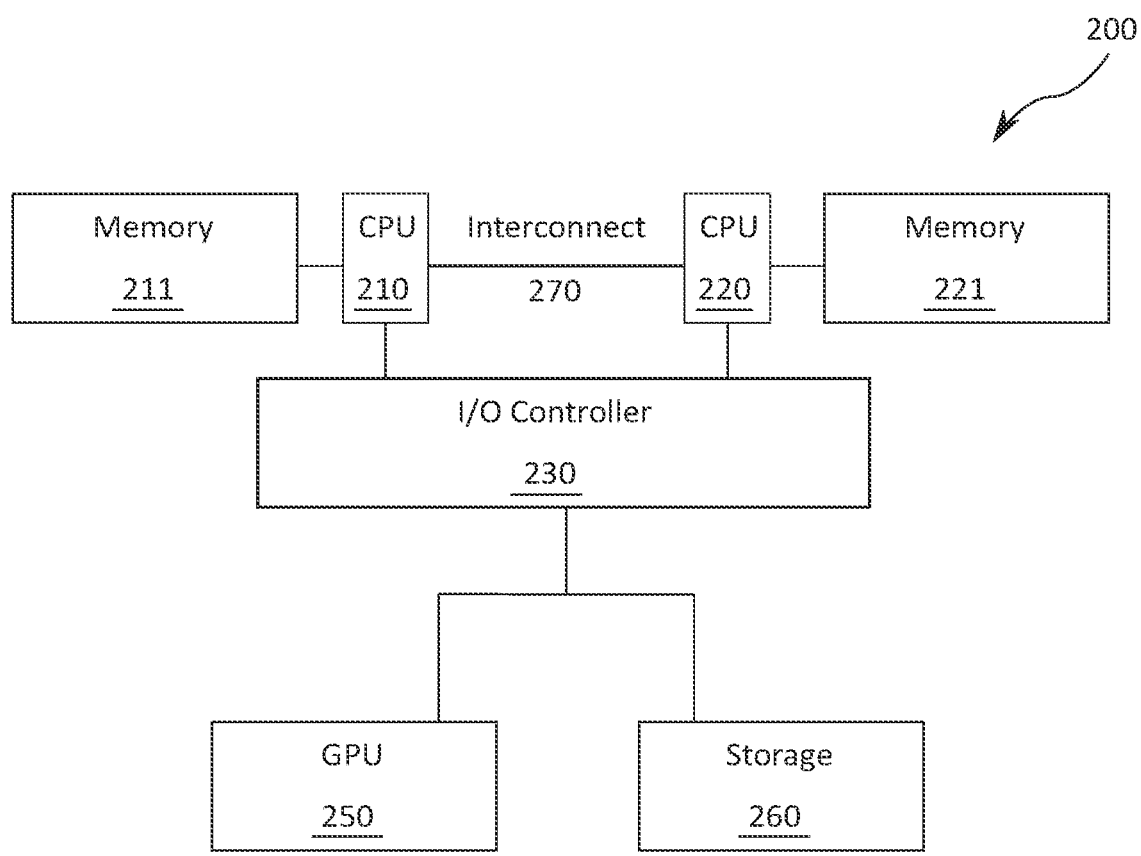
Figure 3:
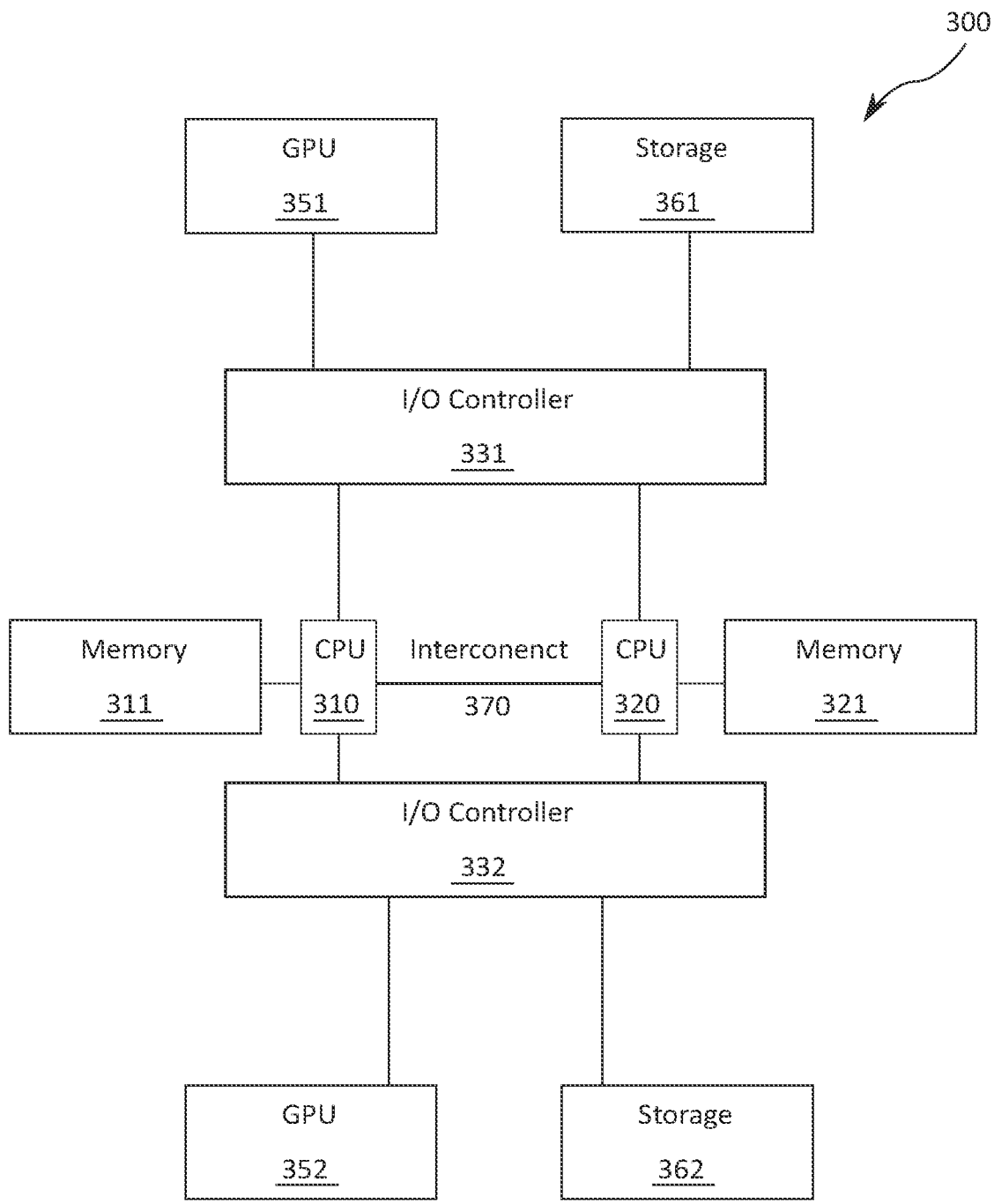
Figure 4:
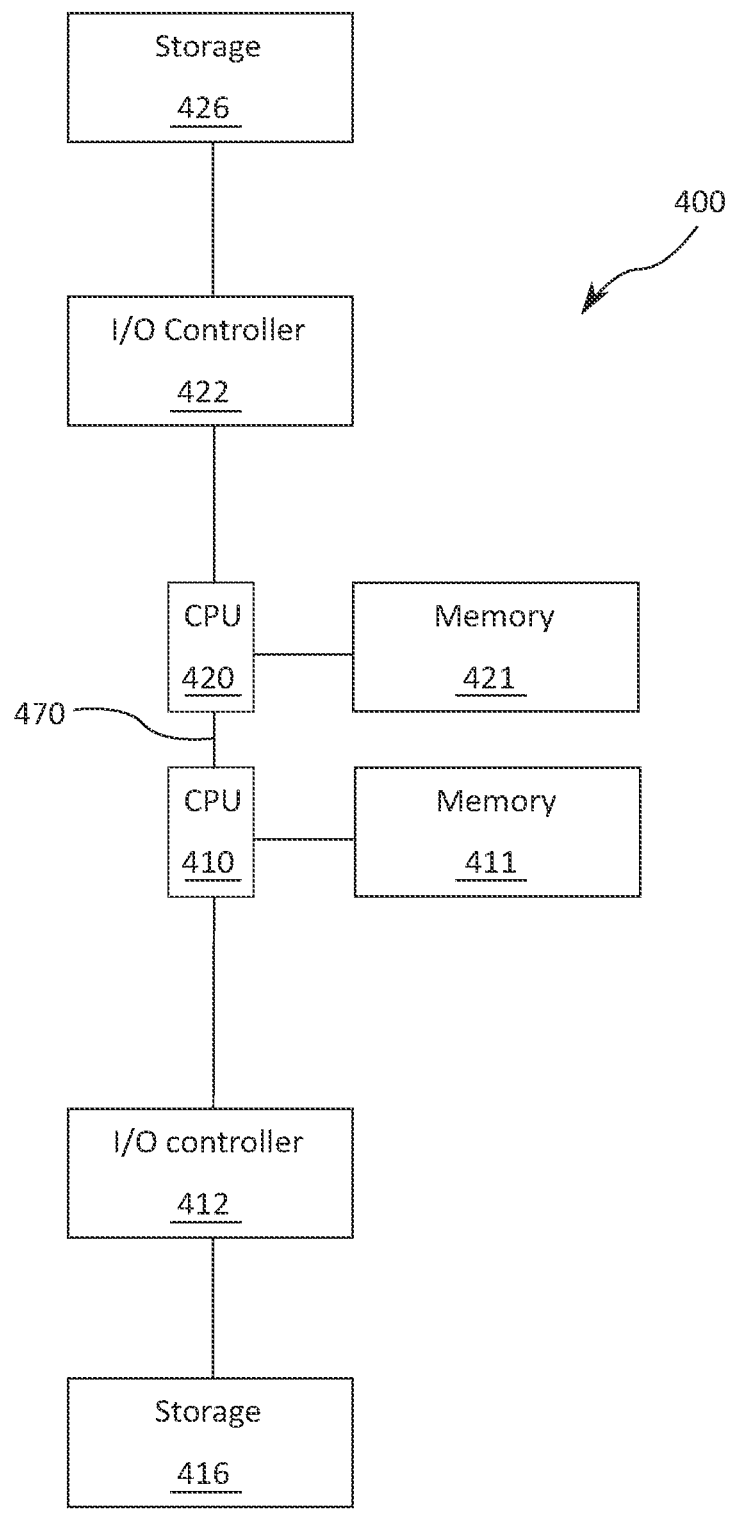
Figure 5:
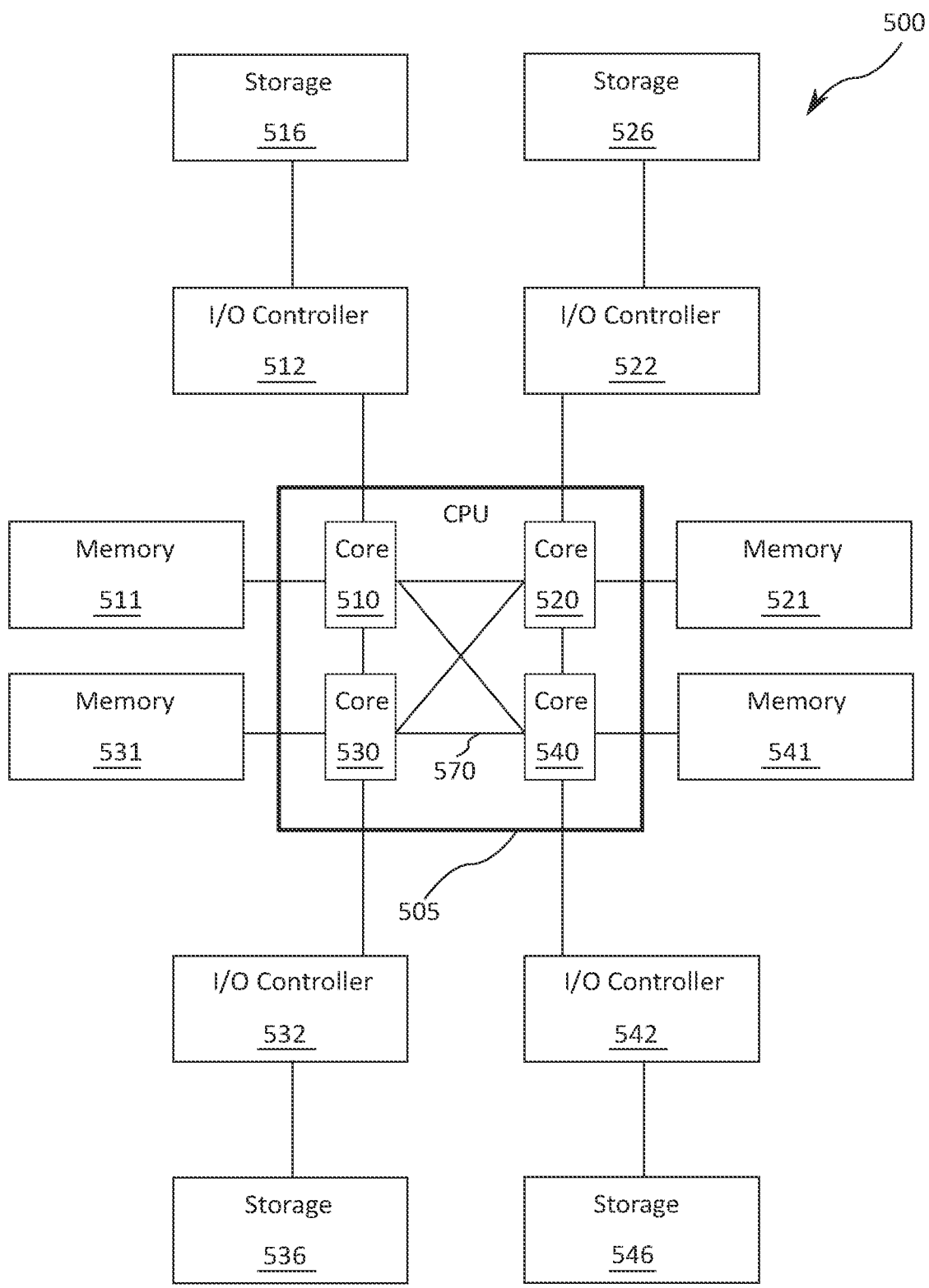
Figure 6:
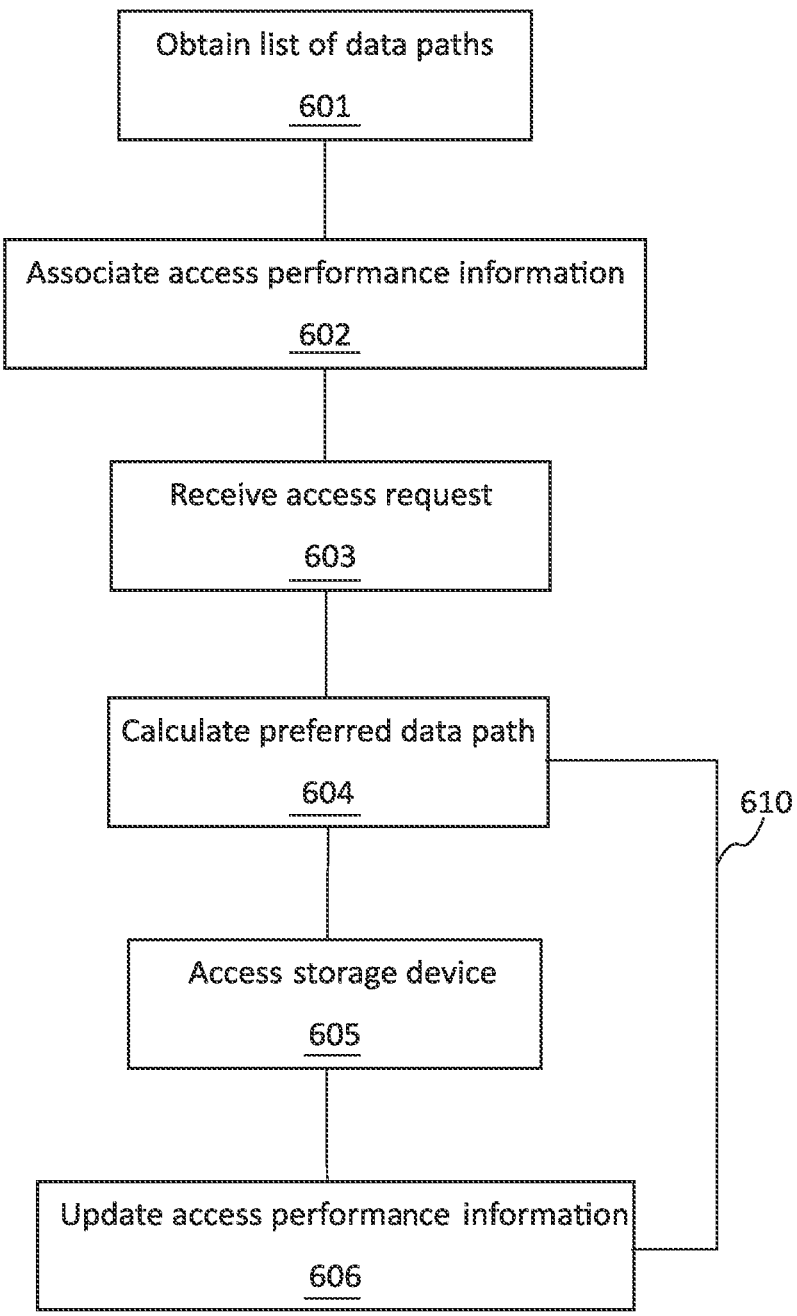
Figure 7:
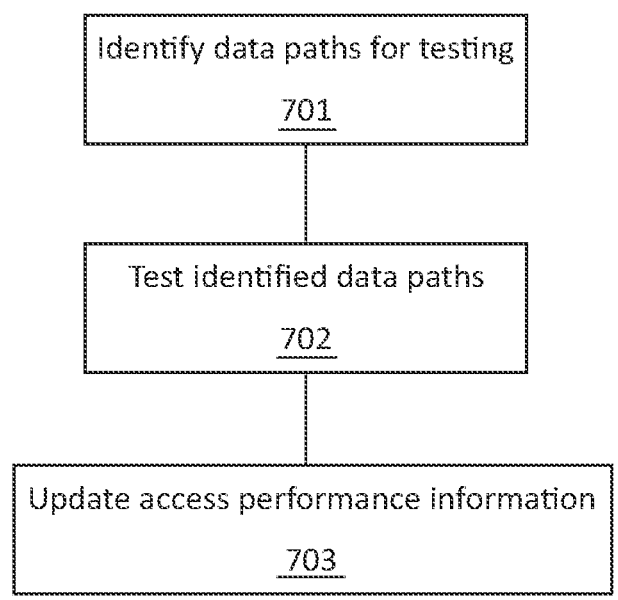

FIG. 1 shows an example storage system.
FIG. 2 shows an example NUMA system.
FIG. 3 shows a further example NUMA system.
FIG. 4 shows another example NUMA system.
FIG. 5 shows a still further example NUMA system.
FIG. 6 shows an example approach for accessing data.
FIG. 7 shows an example approach for periodically testing access performance information.

DETAILED DESCRIPTION

An approach for a storage controller is described with reference to FIG. 1 which allows the storage controller to handle requests to read and write data on a persistent storage device. The persistent storage device is a system for storing data in a persistent manner and may comprise one or more drives in different configurations.

The storage controller 110 is in communication with a persistent storage device 120. The persistent storage device 120 is a system for storing data in a persistent manner. Although the persistent storage device is shown as a single component, in practice it may comprise multiple drives (such as hard disk drives or solid drive drives) arranged into groups and may be distributed over a number of storage nodes. Data is stored across the drives and may have error correcting encoding applied to reduce the risk of data loss if a component of the persistent storage device 120 fails.

Data is stored on the persistent storage devices 120 in blocks. A block is a unit of data of predetermined size, such as 4 KiB (4096 bytes). The storage controller 110 is configured to use logical block addressing (LBA) when receiving requests to interact with the persistent storage device 120. LBA provides that each block of data stored on the persistent storage device 120 is identified by a unique integer LBA value. The storage controller 110 may translate an LBA value to determine which physical location on which persistent storage device the data is actually stored on.

The storage controller 110 is further in communication with a cache 130. The cache comprises non-volatile memory chips configured to operate as a non-volatile cache. This may involve the use of flash memory alone or in combination with conventional volatile memory. The non-volatile memory chips may be configured as non-volatile dual in-line memory modules (NVDIMM).

While the storage controller is described as a single component, in practice the different functions of the storage controller may be split across different entities. For example, interactions with the cache 130 may occur through a cache controller independent of the storage controller 110.

NUMA

NUMA (Non-Uniform Memory Access) is a multiprocessing computing system where at least the memory access time depends on the memory location relative to each processor. In some implementations, the memory access time depends on the memory location relative to particular cores of a processor. Further access time to particular I/O controllers and the peripherals connected to the I/O controllers can be relative to a particular processor or particular cores of a processor.

A NUMA node may be a single CPU (central processing unit), a group of CPUs, a CPU core or a group of CPU cores.

FIG. 2 shows an example NUMA system. The system 200 comprises at least two CPUs 210, 220, memory associated with each CPU (local memory) 211, 221, an I/O Controller 230 and one or more peripherals connected to the I/O controller. The peripherals may include at least one GPU (graphics processing unit) 250 and persistent storage device 260. The CPUs 210, 220 are connected by an interconnect 270.

The interconnect 270 allows CPUs 210, 220 to access the local memory associated with the other CPU. For example, CPU 210 uses the interconnect 270 to access memory 221 associated with CPU 220.

Various implementations of NUMA systems exist. FIG. 3 shows an alternative implementation.

The system 300 comprises at least two CPUs 310, 320, memory associated with each CPU 311, 321 (local memory), two I/O controllers 331 and 332 and one or more peripherals connected to each I/O controller 331, 332. The peripherals may include at least one GPU (graphics processing unit) 351, 352 and persistent storage devices 361, 362 associated with each respective I/O controller 331, 332. The CPUs 310, 320 are connected by an interconnect 370.

The interconnect 370 allows CPUs 310, 320 to access the local memory of the other CPU. For example, CPU 310 uses the interconnect 370 to access memory 321 associated with CPU 320.

FIG. 4 shows another alternative implementation.

The system 400 comprises at least two CPUs 410, 420, memory associated with each CPU 411, 421 (local memory), I/O controller 412 and 422 associated with each CPU (local I/O controller) and one or more peripherals connected to each I/O controller 412, 422 (local peripherals). For simplicity the only peripherals shown in FIG. 4 are persistent storage devices 416, 426 (local persistent storage devices). However other peripherals may be used in the implementation shown in FIG. 4. The CPUs 410, 420 are connected by an interconnect 470.

The interconnect 470 allows CPUs 410, 420 to access the local memory and local peripherals associated with the other CPU. For example, CPU 410 uses the interconnect 470 to access memory 421 associated with CPU 420. CPU 410 also uses the interconnect 470 to access local persistent storage device 426 associated with CPU 420.

FIG. 5 shows yet another alternative implementation.

The system 500 comprises at least one CPU 505 having a plurality of CPU cores 510, 520, 530 and 540, memory associated with each CPU core 511, 521, 531 and 541 (local memory), I/O controllers 512, 522, 532 and 542 (local I/O controllers) and one or more peripherals connected to each I/O controller (local peripherals). For simplicity the only peripherals shown in FIG. 5 are persistent storage devices 516, 526, 536 and 546 (local persistent storage devices). However other peripherals may be used in the implementation shown in FIG. 5. The CPU cores 510, 520, 530 and 540 are connected by an interconnect 570.

The interconnect 570 allows CPU cores 510, 520, 530 and 540 to access local memory and local peripherals associated with the other CPU cores 510, 520, 530 and 540. For example, CPU core 510 uses the interconnect 570 to access local memory 521 associated with CPU core 520. In a further example CPU core 520 uses the interconnect 570 to access local persistent storage device 546 associated with CPU 540.

While FIG. 5 has been illustrated with respect to CPU cores it can equally be applicable to multiple CPUs. Further each CPU core 510, 520, 530, and 540 has been illustrated as having a local I/O controller 512, 522, 532 and 542 associated with the respective core 510, 520, 530, and 540, alternatively a group of CPU cores may share an I/O controller. In another alternative a group of CPU cores 510, 520, 530, and 540 may share local memory. In a similar manner a group of CPU cores may share access to a shared local persistent storage device.

As can be seen in the illustrated implementations of the NUMA system, there can be a number of paths from the respective CPUs or CPU cores to persistent storage devices.

Data Access

The storage controller is configured to administer access data (reading and writing data) from the persistent storage devices. FIG. 6 shows an example approach through which the storage controller can access data.

At step 601 the storage controller obtains a list of data paths to one or more persistent storage devices through a plurality of NUMA nodes having associated CPU or CPU cores, memory and I/O controllers.

The storage controller obtains the list of data paths by requesting from the system the data paths to the persistent storage devices.

At step 602 the storage controller associates access performance information with each of the data paths in the list.

Access performance information may include the last update time of the access performance information, the latency of the data path, an average bandwidth indicator of the data path, the current load on the data path, and a reliability indicator of the data path.

At step 603 the storage controller receives a request to access one of the persistent storage devices. The access request may be a request to read data or to write data or to both read and write data.

The request comprises an indication of the data to be read or written and an LBA value to indicate the location on one persistent storage device of the data to be read or the location on one persistent storage device that the data should be stored.

At step 604 the storage controller calculates the preferred data path to the persistent storage device to be accessed using the access performance information.

The storage controller calculates the preferred path using the available access performance information including one or more of the latency of the data path, an average bandwidth indicator of the data path, the current load on the data path, and a reliability indicator of the data path.

At step 605 the storage controller accesses the persistent storage device to be accessed using the preferred data path.

At step 606 the storage controller updates the access performance information of the used data path.

Access performance information that is updated may include the last update time of the access performance information, the latency of the data path, an average bandwidth indicator of the data path, the current load on the data path, and a reliability indicator of the data path.

In some embodiments the access performance information is not updated for the used data path every time an access path is used. The access performance information may only be updated periodically.

In the event a data path has an error the storage controller updates the access performance information to indicate the error and returns 610 to step 604. The storage controller then recalculates the preferred data path to the persistent storage device to be accessed using the updated access performance information, including the error information.

Access Path Performance Information

The storage controller may be configured to periodically test access performance and update access performance information.

The frequency that the storage controller periodically tests access performance and update access performance information may be a set period and may depend on the number of access requests or depend on the system load.

Further any other method for selecting the period that the storage controller periodically tests access performance and updates access performance information may be selected, including a combination of the above methods for setting the period.

On system start up the storage controller may test all data paths and set or update access performance information for each data path. The access performance information may be stored on system shutdown and the storage controller may obtain the stored access performance information on system startup.

FIG. 7 shows an example approach by which the storage controller can test access.

At step 701 the storage controller identifies data paths for testing.

At step 702 the storage controller tests the identified data paths.

At step 703 the storage controller updates the access performance information of the tested data path.

Data paths may be identified for testing by calculating for each access path the age of the access performance information using the last update time. The last update time will typically be stored as the system access time but may be stored in any other suitable format. The storage controller using the age of the access performance information can identify paths for testing as those data paths having access performance information exceeding an age threshold.

The age threshold may be a set age or alternatively the age threshold may be a calculated age such that the system identifies a percentage of all data paths as aged. The percentage may be any percentage but will typically be less than 50% of the data paths.

Alternatively, the storage controller may identify data paths for testing by selecting a percentage of all data paths for testing.

Further the storage controller may identify data paths for testing by selecting all the data paths that have an error for testing.

Interpretation

A number of methods have been described above. Any of these methods may be embodied in a series of instructions, which may form a computer program. These instructions, or this computer program, may be stored on a computer readable medium, which may be non-transitory. When executed, these instructions or this program cause a processor to perform the described methods.

Where an approach has been described as being implemented by a processor, this may comprise a plurality of processors. That is, at least in the case of processors, the singular should be interpreted as including the plural. Where methods comprise multiple steps, different steps or different parts of a step may be performed by different processors.

The steps of the methods have been described in a particular order for ease of understanding. However, the steps can be performed in a different order from that specified, or with steps being performed in parallel. This is the case in all methods except where one step is dependent on another having been performed.

The term "comprises" and other grammatical forms is intended to have an inclusive meaning unless otherwise noted. That is, they should be taken to mean an inclusion of the listed components, and possibly of other non-specified components or elements.

While the present invention has been explained by the description of certain embodiments, the invention is not restricted to these embodiments. It is possible to modify these embodiments without departing from the spirit or scope of the invention.

The invention claimed is:

1. A method comprising:
obtaining a list of data paths from at least one central processing unit (CPU) core to at least one persistent storage device;
associating access performance information with each data path;
receiving a request to access a first persistent storage device of the at least one persistent storage device;
calculating a preferred data path from the at least one CPU core to the first persistent storage device using the access performance information;
accessing the first persistent storage device using the preferred data path; and
updating the access performance information of the used data path,
wherein the access performance information of each data path includes at least a last update time of the access performance information.

2. The method of claim 1, further comprising:
identifying ones of the data paths for testing;
testing the identified data paths; and
updating the access performance information of the tested data paths.

3. The method of claim 2, wherein identifying ones of the data paths for testing comprises:
calculating an age of the access performance information using the last update time; and
identifying ones of the data paths for which the age of the access performance information exceeds an age threshold.

4. The method of claim 2, wherein identifying ones of the data paths for testing comprises selecting a percentage of all data paths for testing.

5. The method of claim 2, wherein identifying ones of the data paths for testing comprises selecting all the data paths that have an error for testing.

6. The method of claim 1, wherein the access performance information of each data path includes at least a latency of the data path.

7. The method of claim 6, wherein the preferred data path is calculated based on at least the latency of each data path.

8. The method of claim 1, wherein the access performance information of each data path includes at least an average bandwidth indicator of the data path.

9. The method of claim 8, wherein the preferred data path is calculated based on at least the average bandwidth indicator of each data path.

10. The method of claim 1, wherein the access performance information of each data path includes at least a load on the data path.

11. The method of claim 10, wherein the preferred data path is calculated based on at least the load on each data path.

12. The method of claim 1, wherein the access performance information of each data path includes at least a reliability indicator of the data path.

13. The method of claim 12, wherein the preferred data path is calculated based on at least the reliability indicator on each data path.

14. The method of claim 1, wherein accessing the first persistent storage device comprises read access.

15. The method of claim 1, wherein accessing the first persistent storage device comprises write access.

16. A system comprising:
a memory;
a plurality of non-uniform memory access (NUMA) nodes, each NUMA node comprising:
at least one central processing unit (CPU) core; and
at least a portion of the memory attached to the at least one CPU core,
wherein the memory stores instructions that, when executed by the plurality of NUMA nodes, configures the system to:
obtain a list of data paths from a first one of the at least one CPU core to at least one persistent storage device;
associate access performance information with each data path;
receive a request to access a first persistent storage device of the at least one persistent storage device;
calculate a preferred data path from the first CPU core to the first persistent storage device using the access performance information;
access the first persistent storage device using the preferred data path; and
update the access performance information of the used data path,
wherein the access performance information of each data path includes at least a last update time of the access performance information.

17. A non-transitory computer readable medium comprising instructions which, when executed by one or more processors, cause a computing device to perform steps comprising:
obtaining a list of data paths from at least one central processing unit (CPU) core to at least one persistent storage device;
associating access performance information with each data path;
receiving a request to access a first persistent storage device of the at least one persistent storage device;
calculating a preferred data path from the at least one CPU core to the first persistent storage device using the access performance information;
accessing the first persistent storage device using the preferred data path; and
updating the access performance information of the used data path,
wherein the access performance information of each data path includes at least a last update time of the access performance information.

* * * * *